(12) United States Patent
Lee (10) Patent No.: US 12,252,135 B2
(45) Date of Patent: Mar. 18, 2025

(54) VEHICLE CONTROLLER AND METHOD THEREOF

(71) Applicants: HYUNDAI MOTOR COMPANY, Seoul (KR); KIA CORPORATION, Seoul (KR)

(72) Inventor: Ki Won Lee, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 638 days.

(21) Appl. No.: 17/398,849

(22) Filed: Aug. 10, 2021

(65) Prior Publication Data

US 2022/0161805 A1 May 26, 2022

(30) Foreign Application Priority Data

Nov. 26, 2020 (KR) .................. 10-2020-0161691

(51) Int. Cl.
*B60W 30/095* (2012.01)
*B60W 30/18* (2012.01)
(Continued)

(52) U.S. Cl.
CPC ........ *B60W 40/09* (2013.01); *B60W 30/0953* (2013.01); *B60W 30/0956* (2013.01);
(Continued)

(58) Field of Classification Search
CPC ........ B60K 35/00; B60K 35/10; B60K 35/23; B60K 35/28; B60K 35/85; B60K 2360/149; B60K 2360/177; B60K 2360/178; B60K 2360/5915; B60T 7/22; B60T 8/17557; B60T 17/22; B60T 2201/022; B60T 2201/08; B60T 2210/24; B60T 2210/34; B60T 2210/36; B60W 30/095; B60W 30/0953; B60W 30/0956; B60W 30/12; B60W 30/16; B60W 30/18109; B60W 30/18163; B60W 40/09; B60W 50/0097; B60W 50/14; B60W 2050/146;
(Continued)

(56) References Cited

U.S. PATENT DOCUMENTS

| 2009/0088925 | A1* | 4/2009 | Sugawara | ............. | B60W 30/12 340/436 |
| 2013/0297172 | A1* | 11/2013 | Ariga | .................... | B60W 30/16 701/70 |

(Continued)

FOREIGN PATENT DOCUMENTS

KR 20170101758 A * 9/2017 ......... G01C 21/3626

*Primary Examiner* — Peter D Nolan
*Assistant Examiner* — Ce Li Li
(74) *Attorney, Agent, or Firm* — Lempia Summerfield Katz LLC (57) ABSTRACT

A vehicle controller and a method thereof are provided. The vehicle controller includes a processor that determines whether a driver has an intention to make a lane change using at least one of a steering angle condition, a gaze condition of the driver, or a driving pattern condition of the driver. The processor shares lane change information with a surrounding vehicle, when it is determined that the driver has the intention to make the lane change. The controller also has a storage storing data and an algorithm run by the processor.

10 Claims, 10 Drawing Sheets

(51) Int. Cl.
 *B60W 40/09* (2012.01)
 *B62D 15/02* (2006.01)
 *H04W 4/46* (2018.01)

(52) U.S. Cl.
 CPC ..... *B60W 30/18109* (2013.01); *B62D 15/021* (2013.01); *H04W 4/46* (2018.02); *B60W 2554/4045* (2020.02); *B60W 2554/4046* (2020.02); *B60W 2554/4048* (2020.02)

(58) Field of Classification Search
 CPC ....... B60W 2520/105; B60W 2540/12; B60W 2540/18; B60W 2540/225; B60W 2552/00; B60W 2552/30; B60W 2554/4045; B60W 2554/4046; B60W 2554/4048; B60W 2556/10; B60W 2556/65; B60W 2756/10; B62D 15/021; B62D 15/0255; B62D 15/0265; G01S 13/931; G01S 2013/9316; G08G 1/162; G08G 1/166; G08G 1/167; H04W 4/46
 See application file for complete search history.

(56) References Cited

U.S. PATENT DOCUMENTS

| | | | | |
|---|---|---|---|---|
| 2014/0136015 | A1* | 5/2014 | Hayakawa | G08G 1/167 701/1 |
| 2017/0235305 | A1* | 8/2017 | Jung | B60W 40/072 701/23 |
| 2017/0345310 | A1* | 11/2017 | Yoon | G08G 1/161 |

* cited by examiner

| DETERMINATION CONDITION | WHEN STEERING ANGLE OBTAINED BY CORRECTING ROAD CURVATURE IS GREATER THAN OR EQUAL TO A VALUES ABOVE B SECONDS |
|---|---|

| ADDITIONAL CONDITION 1 | ADDITIONAL CONDITION 2 |
|---|---|
| DETECT MOTION CHECKING WINDOW AT LANE CHANGE ABOVE C TIMES AND D SECONDS | CHANGE IN ACCELERATION OF EM/S2 OR AMOUNT OF CHANGE IN BRAKING CONTROL SIGNAL THROUGH DECELERATION AND ACCELERATION ADJUSTMENT BEFORE DETERMINING INTENTION OF DRIVER |

VEHICLE CONTROLLER AND METHOD THEREOF

CROSS-REFERENCE TO RELATED APPLICATION

This application claims the benefit of priority to Korean Patent Application No. 10-2020-0161691, filed in the Korean Intellectual Property Office on Nov. 26, 2020, the entire contents of which are incorporated herein by reference.

TECHNICAL FIELD

The present disclosure relates to a vehicle controller and a method thereof, and more particularly, relates to technologies of sharing lane change information with a surrounding vehicle.

BACKGROUND

A vehicle is a device that travels on a road and is loaded or equipped with various devices for protecting passengers, assisting in operation, or improving riding quality.

Recently, research has been actively conducted in an autonomous controller such that the vehicle automatically travels to a destination by controlling the vehicle to recognize road environments for itself, determine driving situations, and travel along a planned driving route.

Such an autonomous controller recognizes a change in location of an obstacle and a line and controls the vehicle to travel on a safe lane while avoiding the obstacle based on the recognized information.

An existing autonomous controller performs driving guidance and driving control using only information of a vehicle or navigation information of the vehicle, which is sensed by a sensor, to have an uppermost limit in driving guidance and driving control in a specific area, which is not sensed by the sensor. For example, when a sensor does not detect that a surrounding vehicle close to a host vehicle makes a lane change or when the sensor senses the surrounding vehicle late, a smart cruise control (SCC) device, which follows a forward vehicle among autonomous controllers, may cause a problem of sudden braking or collision.

SUMMARY

The present disclosure has been made to solve the above-mentioned problems occurring in the prior art while advantages achieved by the prior art are maintained intact.

An aspect of the present disclosure provides a vehicle controller for identifying an intention of a driver to make a lane change and sharing lane change information of a host vehicle with a surrounding vehicle. Thus, the surrounding vehicle varies or changes driving guidance information and notifies the driver of the varied driving guidance information based on the received lane change information and varies or changes driving control. The present disclosure also provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a vehicle controller may include a processor that determines whether a driver has an intention to make a lane change using at least one of a steering angle condition, a gaze condition of the driver, or a driving pattern condition of the driver. The processor may share lane change information with a surrounding vehicle, when it is determined that the driver has the intention to make the lane change. The vehicle controller may also include a storage storing data and an algorithm run by the processor.

In an embodiment, the vehicle controller may further include a communication device that transmits the lane change information to the surrounding vehicle and receives lane change information of the surrounding vehicle.

In an embodiment, the processor may subtract road curvature from a steering angle and may determine whether the steering angle obtained by subtracting the road curvature is greater than or equal to a predetermined value above a predetermined time to determine whether the driver has the intention to make the lane change.

In an embodiment, the processor may determine whether a gaze of the driver moves to a side mirror or a window above a predetermined number of times during a predetermined time to determine whether the driver has the intention to make the lane change.

In an embodiment, the processor may determine whether a change in acceleration is greater than or equal to a predetermined value or whether a braking control signal is generated above a predetermined number of times or is detected above a certain amount of change to determine whether the driver has the intention to make the lane change.

In an embodiment, the processor may reduce and apply a predetermined time of the steering angle condition in which the road curvature is corrected, when one of the gaze condition of the driver or the driving pattern condition of the driver is met.

In an embodiment, the processor may determine whether a lane change direction is identical to an existing guidance route or ON information of a turn signal, when the driver has the intention to make the lane change. The processor may share the lane change information with the surrounding vehicle, when the lane change direction is identical to the existing guidance route or the ON information of the turn signal.

In an embodiment, the vehicle controller may further include a camera that detects a gaze of the driver, a steering angle sensor that senses a steering angle of a vehicle, and an acceleration sensor that senses a change in acceleration of the vehicle.

According to another aspect of the present disclosure, a vehicle controller may include a processor that changes driving guidance information based on lane change information and varies driving control of a vehicle, when receiving the lane change information from a surrounding vehicle. The vehicle controller may also include a storage storing data and an algorithm run by the processor.

In an embodiment, the vehicle controller may further include an interface that outputs an alert sound, when receiving the lane change information.

In an embodiment, the interface may include at least one of a windshield glass, a head up display (HUD), a cluster, an audio video navigation (AVN), a human machine interface (HMI), or a user setting menu (USM) of the vehicle.

In an embodiment, the processor may display that a vehicle which is a target of the lane change information is a lane change vehicle and may output a lane change direction of the lane change vehicle on the interface.

In an embodiment, the processor may output the lane change vehicle as a real image on the interface and may output words for providing a notification of a lane change on the interface.

In an embodiment, the processor may vary or change a setting of an autonomous driving function depending on the lane change information while the autonomous driving function of a host vehicle operates, when receiving the lane change information.

In an embodiment, the processor may decelerate the host vehicle when receiving lane change information and may change a following target vehicle to a lane change target vehicle, when the autonomous driving function is smart cruise control (SCC).

According to another aspect of the present disclosure, a vehicle control method may include determining whether a driver has an intention to make a lane change using at least one of a steering angle condition, a gaze condition of the driver, or a driving pattern condition of the driver. The vehicle control method may also include sharing lane change information with a surrounding vehicle, when it is determined that the driver has the intention to make the lane change. The vehicle control method may also include changing driving guidance information based on lane change information and varying or changing driving control of a vehicle, when receiving the lane change information from the surrounding vehicle.

In an embodiment, the determining of whether the driver has the intention to make the lane change may include subtracting road curvature from a steering angle and determining whether the steering angle obtained by subtracting the road curvature is greater than or equal to a predetermined value above a predetermined time to determine whether the driver has the intention to make the lane change. The determining may also include determining whether a gaze of the driver moves to a side mirror or a window above a predetermined number of times during a predetermined time to determine whether the driver has the intention to make the lane change. The determining may also include determining whether a change in acceleration is greater than or equal to a predetermined value or whether a braking control signal is generated above a predetermined number of times or is detected above a certain amount of change to determine whether the driver has the intention to make the lane change.

In an embodiment, the vehicle control method may further include reducing and applying a predetermined time of the steering angle condition in which the road curvature is corrected, when one of the gaze condition of the driver or the driving pattern condition of the driver is met.

In an embodiment, the sharing of the lane change information with the surrounding vehicle may include determining whether a lane change direction is identical to a previous guidance route or ON information of a turn signal, when the driver has the intention to make the lane change. The sharing of the lane change information may also include sharing the lane change information with the surrounding vehicle, when the lane change direction is identical to the previous guidance route or the ON information of the turn signal.

In an embodiment, the changing of the driving guidance information and the varying or changing of the driving control of the vehicle may include displaying that a vehicle which is a target of the lane change information is a lane change vehicle as a real image, displaying a lane change direction of the lane change vehicle, and displaying words for providing a notification of the lane change.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure. When a component, device, element, or the like of the present disclosure is described as having a purpose or performing an operation, function, or the like, the component, device, or element should be considered herein as being "configured to" meet that purpose or to perform that operation or function.

In describing the components of the embodiment according to the present disclosure, terms such as first, second, "A", "B", (a), (b), and the like may be used. These terms are merely intended to distinguish one component from another component and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art. Such terms should not be interpreted as having ideal or excessively formal meanings unless clearly defined as having such in the present application.

Figure 1:
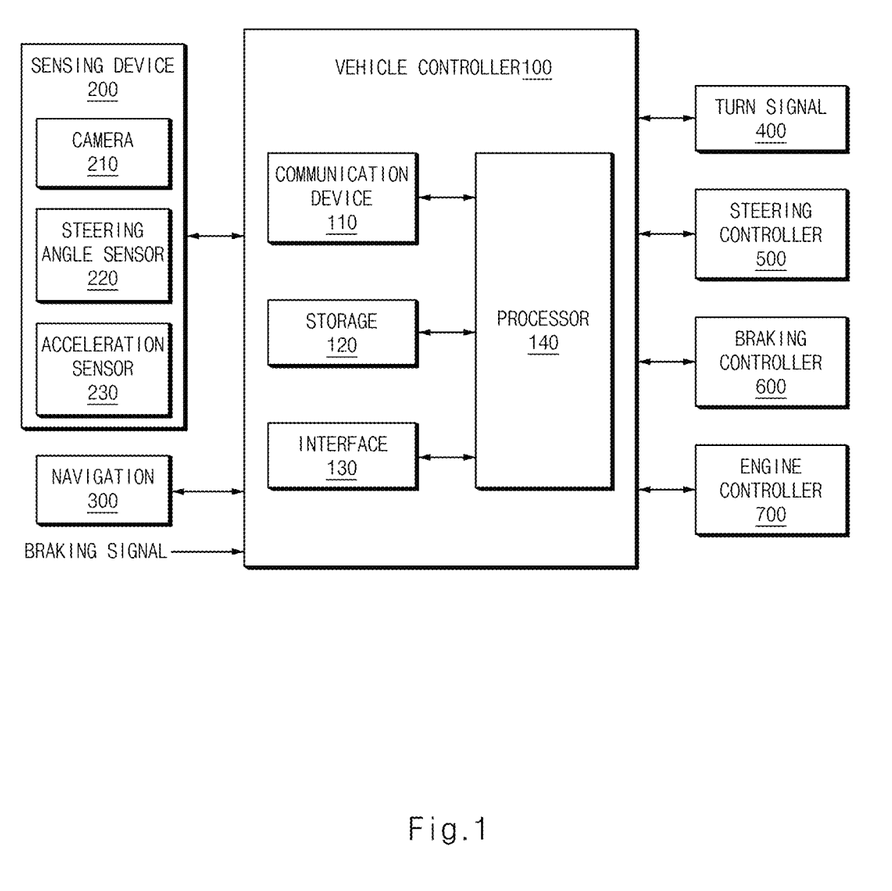
FIG. 1 is a block diagram illustrating a configuration of a vehicle system including a vehicle controller according to an embodiment of the present disclosure.

Hereinafter, embodiments of the present disclosure are described in detail with reference to FIGS. 1-8. FIG. 1 is a block diagram illustrating a configuration of a vehicle system including a vehicle controller according to an embodiment of the present disclosure.

Referring to FIG. 1, the vehicle system according to an embodiment of the present disclosure may include an autonomous controller 100, a sensing device 200, a navigation 300, a turn signal 400, a steering controller 500, a braking controller 600, and an engine controller 700.

The vehicle controller 100 according to an embodiment of the present disclosure may be implemented in a vehicle. In this case, the vehicle controller 100 may be integrally configured with control units in the vehicle or may be implemented as a separate device to be connected with the control units of the vehicle by a separate connection means.

The vehicle controller 100 may determine whether a driver has an intention to make a lane change using at least one of a steering angle condition, a gaze condition of the driver, or a driving pattern condition of the driver. When it is determined or when determining that the driver has the intention to make the lane change, the vehicle controller 100 may share lane change information with a surrounding vehicle.

Furthermore, when receiving lane change information from a surrounding vehicle, the vehicle controller 100 may change driving guidance information based on the lane change information to vary or change driving control of the vehicle.

To this end, the vehicle controller 100 may include a communication device 110, a storage 120, an interface 130, and a processor 140.

The communication device 110 may be a hardware device implemented with various electronic circuits to transmit and receive a signal through a wireless or wired connection, which may transmit and receive information with devices in the vehicle based on a network communication technology in the vehicle. As an example, the network communication technology in the vehicle may include controller area network (CAN) communication, local interconnect network (LIN) communication, flex-ray communication, or the like.

Furthermore, the communication device 110 may communicate with a server, an infrastructure, a surrounding vehicle, or the like outside the vehicle through a wireless Internet technology or a short range communication technology. Herein, the wireless Internet technology may include wireless local area network (WLAN), wireless broadband (WiBro), wireless-fidelity (Wi-Fi), world interoperability for microwave access (WiMAX), or the like. Furthermore, the short range communication technology may include Bluetooth, ZigBee, ultra wideband (UWB), radio frequency identification (RFID), infrared data association (IrDA), or the like.

As an example, the communication device 110 may share lane change information of a host vehicle with surrounding vehicles. In this case, the lane change information may include information, such as whether to make a lane change or a lane change direction.

The storage 120 may store a sensing result of the sensing device 200 and data, an algorithm, and/or the like necessary for an operation of the processor 140.

As an example, the storage 120 may store lane change information. Furthermore, the storage 120 may store information about a face or gaze of the driver sensed by the sensing device 200, steering angle information of the vehicle, braking control information of the vehicle, or the like.

The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The interface 130 may include an input means for receiving a control command from a user and an output means for outputting an operation state, an operation result, or the like of the vehicle controller 100. Herein, the input means may include a key button and may further include a mouse, a joystick, a jog shuttle, a stylus pen, or the like. Furthermore, the input means may further include a soft key implemented on a display.

Figure 2:
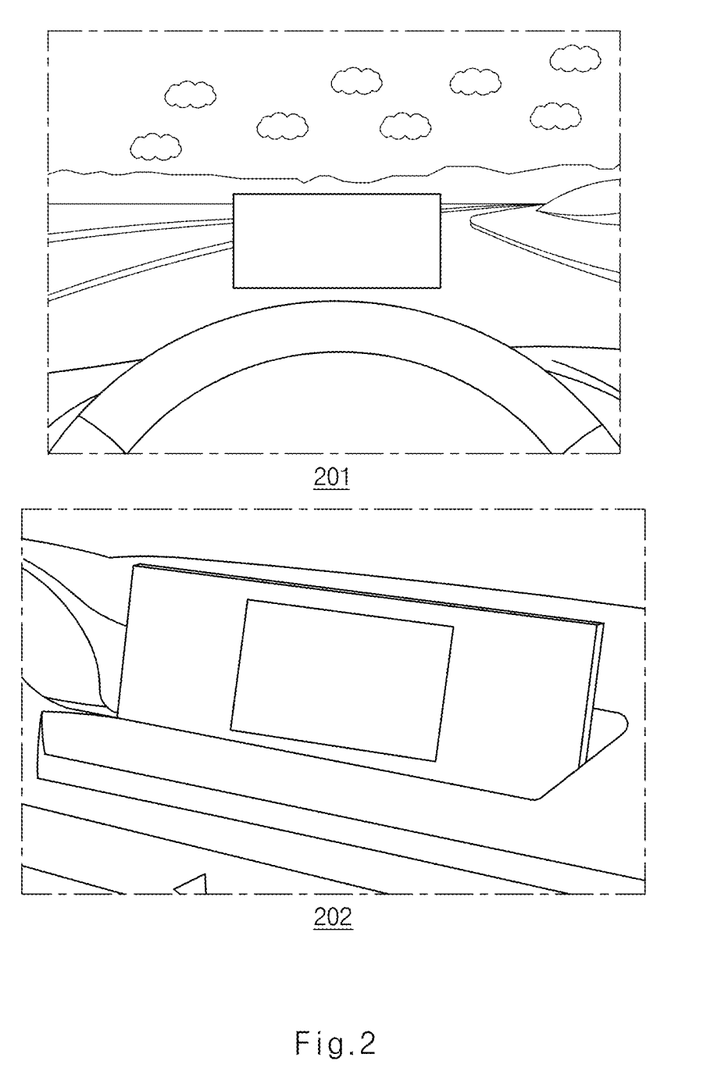
FIG. 2 is a drawing illustrating an example of a display screen of a vehicle controller according to an embodiment of the present disclosure.

The interface 130 may be implemented as a separate device, such as a head up display (HUD), a cluster, an audio video navigation (AVN), a human machine interface (HMI), a user setting menu (USM), or the like. The interface 130 may display an image on a central portion of a window glass like reference numeral 201 of FIG. 2 or may display an image on an AVN like reference numeral 202 of FIG. 2. FIG. 2 is a drawing illustrating an example of a display screen of a vehicle controller according to an embodiment of the present disclosure.

Figure 3A:
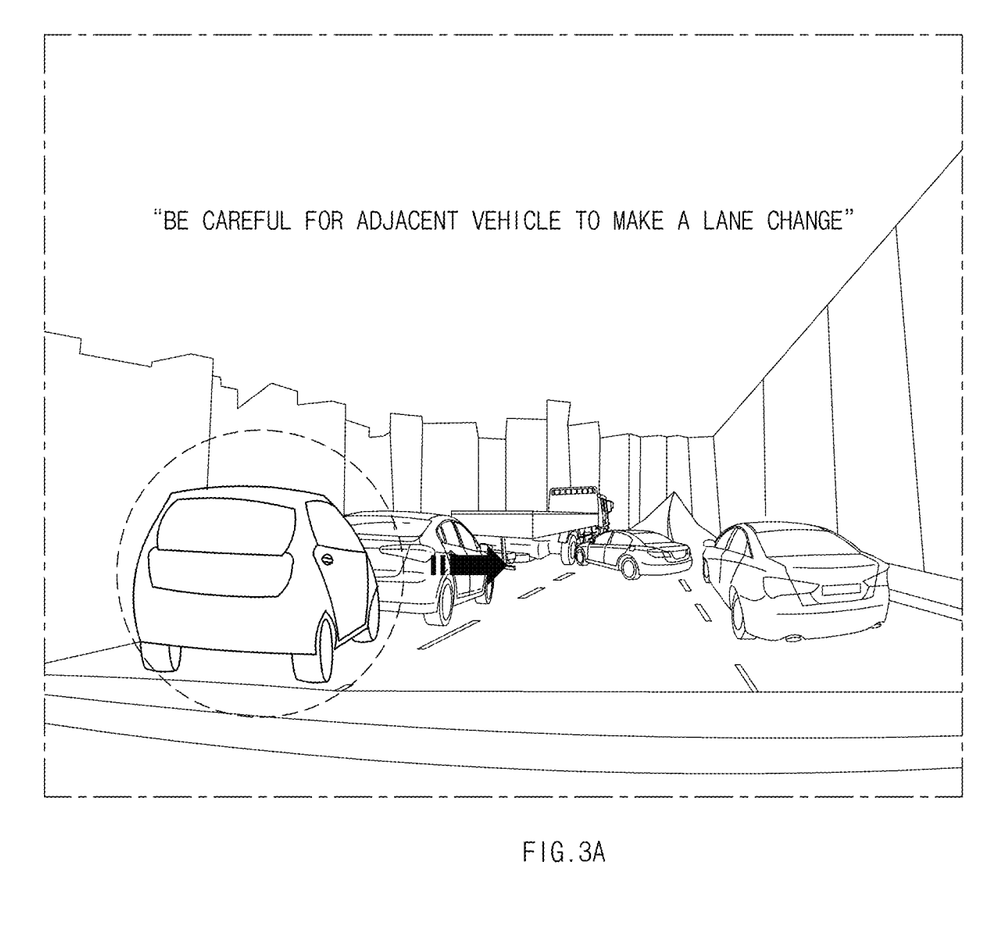
FIGS. 3A, 3B, and 3C are drawings illustrating an example of a driving guidance display screen according to an embodiment of the present disclosure.
Figure 3B:
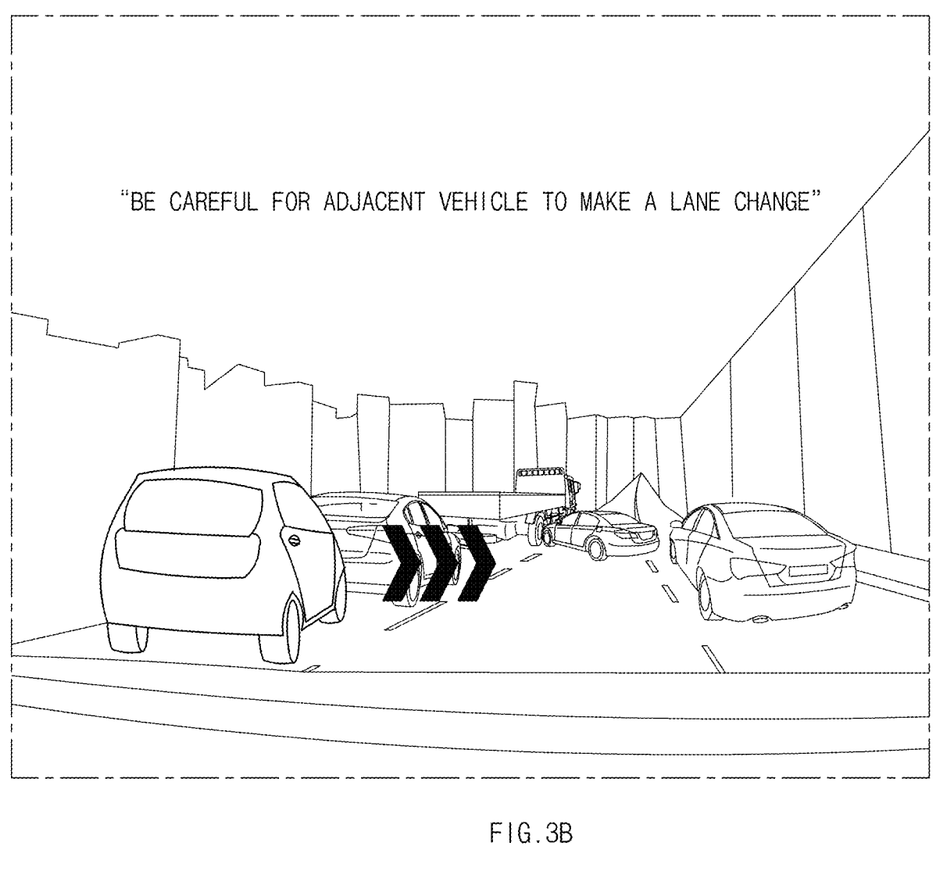
Figure 3C:
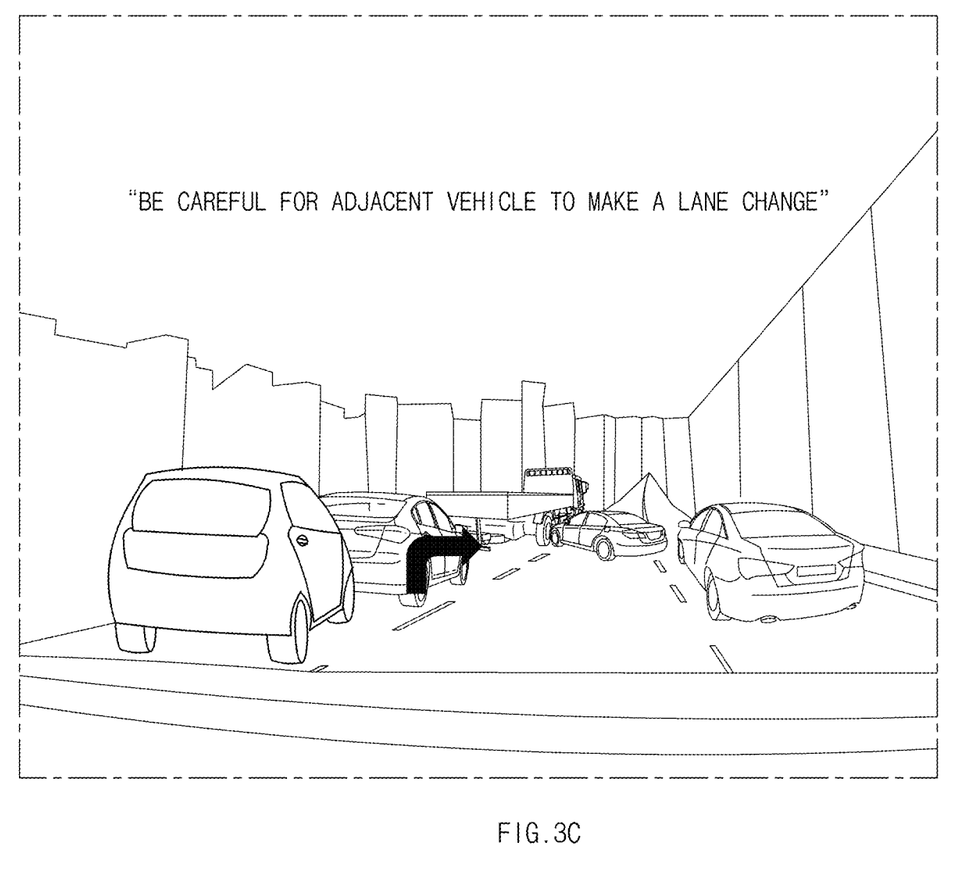

An output means may include a display and may further include a voice output means such as a speaker. In this case, when a touch sensor such as a touch film, a touch sheet, or a touch pad is provided in the display, the display operates as a touchscreen and may be implemented in a form where the input means and the output means are integrated with each other. The output means in an embodiment of the present disclosure may output words of guidance for warning a driver that an adjacent vehicle makes a lane change, a changed driving route, or the like. As shown in FIGS. 3A, 3B, and 3C, the output means may display words of guidance for warning the driver that the adjacent vehicle makes a lane change and may display the adjacent vehicle. FIGS. 3A, 3B, and 3C are drawings illustrating an example of a driving guidance display screen according to an embodiment of the present disclosure. In FIG. 3A, an example of displaying a rounding mark around a vehicle to make a lane change and displaying a lane change direction using an arrow is disclosed. In FIG. 3B, an example of displaying a direction on a vehicle to make a lane change is disclosed. In FIG. 3C, an example of displaying a curved arrow on a vehicle to make a lane change is disclosed.

Furthermore, an output means may be controlled by a processor 140 of FIG. 1 to output an alert sound. In other words, when receiving lane change information from a surrounding vehicle, the output means may output an alert sound such that the driver recognizes it.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The processor 140 may be electrically connected with the communication device 110, the storage 120, the interface 130, or the like and may electrically control the respective components. The processor 140 may be an electrical circuit which executes instructions of software and may perform a variety of data processing and calculation described below.

The processor 140 may process a signal delivered between the respective components of the vehicle controller 100. The processor 140 may be, for example, an electronic control unit (ECU), a micro controller unit (MCU), or another sub-controller, which is loaded into the vehicle.

The processor 140 may determine whether the driver has an intention to make a lane change using at least one of a steering angle condition, a gaze condition of the driver, or a driving pattern condition of the driver. When it is determined that the driver has the intention to make the lane change, the vehicle controller 100 may share lane change information with a surrounding vehicle.

The processor 140 may subtract road curvature from a steering angle and may determine whether the steering angle obtained by subtracting the road curvature is greater than or equal to a predetermined value above a predetermined time to determine whether the driver has an intention to make a lane change (determination condition).

The processor 140 may determine whether a gaze of the driver moves to a side mirror or a window above a predetermined number of times during a predetermined time to determine whether the driver has an intention to make a lane change (additional condition 1).

The processor 140 may determine whether a change in acceleration is greater than or equal to a predetermined value or whether a braking control signal is generated above a predetermined number of times or is detected above a certain amount of change to determine whether the driver has an intention to make a lane change (additional condition 2).

When one of the gaze condition of the driver or the driving pattern condition of the driver is met, the processor 140 may reduce and apply a predetermined time of the steering angle condition in which the road curvature is corrected.

Figure 4:
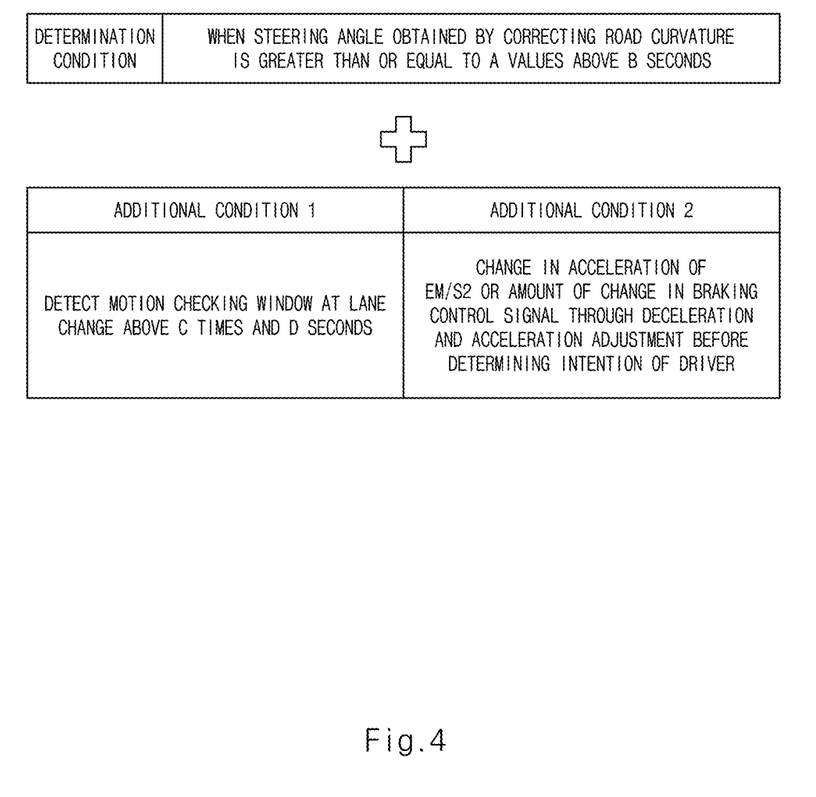
FIG. 4 is a drawing illustrating a condition of determining a lane change intention in a vehicle controller according to an embodiment of the present disclosure.
Figure 5:
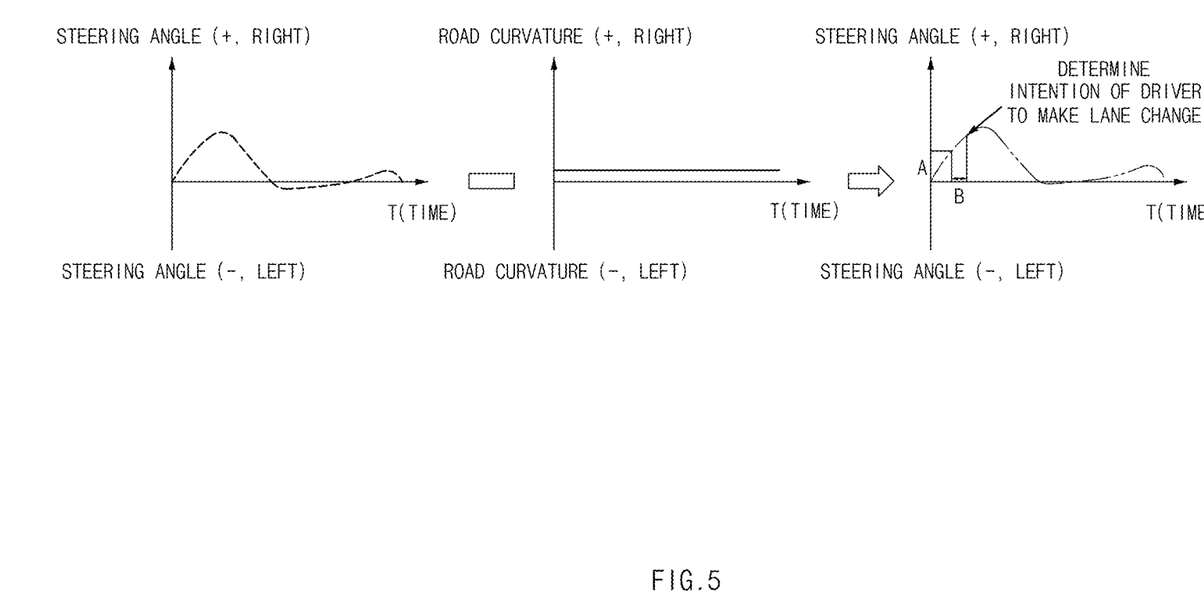
FIG. 5 is a drawing illustrating a condition of determining a lane change intention in a vehicle controller according to an embodiment of the present disclosure.

FIG. 4 is a drawing illustrating a condition of determining a lane change intention in a vehicle controller according to an embodiment of the present disclosure. FIG. 5 is a drawing illustrating a condition of determining a lane change intention in a vehicle controller according to an embodiment of the present disclosure.

Referring to FIG. 4, a vehicle controller 100 of FIG. 1 may determine an intention of a driver to drive based on a sensing result of a sensing device 200 of FIG. 1. In other words, the vehicle controller 100 may determine whether a determination condition is met based on a sensing result of a camera 210 or a steering angle sensor 220 of FIG. 1 and a braking control signal.

When the steering angle obtained by subtracting road curvature is greater than or equal to an A value above B seconds, the vehicle controller 100 may determine that the driver has an intention to make a lane change.

Furthermore, the vehicle controller 100 may detect that a face or a gaze of the driver moves to a side mirror or a side window. When it is detected or when detecting that the face of the driver or the gaze of the driver moves to the side mirror or the side window above C times and above D seconds, the vehicle controller 100 may determine that the driver has an intention to make a lane change (additional condition 1).

Furthermore, when detecting a driving pattern based on a change in acceleration of Em/s2 or the amount of change in braking control signal through deceleration and acceleration adjustment before determining an intention of the driver, the vehicle controller 100 may determine that the driver has an intention to make a lane change (additional condition 2). In this case, the driving pattern may include a deceleration pattern.

In this case, when additional conditions 1 and 2 are met, the vehicle controller 100 may decrease a time (B seconds) when the determination condition is fixed to 50% and may determine whether the driver has an intention to make a lane change.

When the steering angle obtained by subtracting the road curvature is greater than or equal to a predetermined value A during a predetermined time (B seconds), as shown in FIG. 5, the vehicle controller 100 may subtract the road curvature from the steering angle, i.e., may correct the road curvature in the steering angle and may determine whether the driver has an intention to make a lane change using the corrected steering angle.

With regard to motion where the driver checks a side lane upon a lane change, when detecting that a gaze of the driver is maintained at a side mirror or a window above a predetermined number of times during a predetermined time by means of the camera 210, the vehicle controller 100 may determine that the driver has an intention to make a lane change.

With regard to a driving pattern where the driver decelerates or accelerates to secure an inter-vehicle distance upon a lane change, when detecting a change in acceleration above a predetermined acceleration by means of a deceleration and acceleration sensor or when a braking control signal is repeated or is maintained above a certain amount of change (e.g., is repeated three times during a ms), the vehicle controller 100 may determine that the driver has an intention to make a lane change.

When the driver has the intention to make the lane change, the processor 140 may determine whether a lane change direction is identical to an existing guidance route or ON information of a turn signal. When the lane change direction is identical to the existing guidance route or the ON information of the turn signal, the processor 140 may share lane change information with a surrounding vehicle.

When receiving lane change information from a surrounding vehicle, the processor 140 may change driving guidance information based on the lane change information and may vary or change driving control of the vehicle.

The processor 140 may display that a vehicle which is a target of lane change information is a lane change vehicle and may output a lane change direction of the lane change vehicle on an interface 130 of FIG. 1. Furthermore, the processor 140 may output the lane change vehicle as a real image on the interface 130 and may output words for providing a notification of a lane change on the interface 130. Furthermore, when receiving lane change information, the processor 140 may vary or change a setting of an autonomous driving function depending on the lane change information, while the autonomous driving function of a host vehicle operates.

When the autonomous driving function is smart cruise control (SCC), the processor 140 may decelerate the host vehicle, when receiving lane change information, and may change a following target vehicle to a lane change target vehicle.

Figure 6:
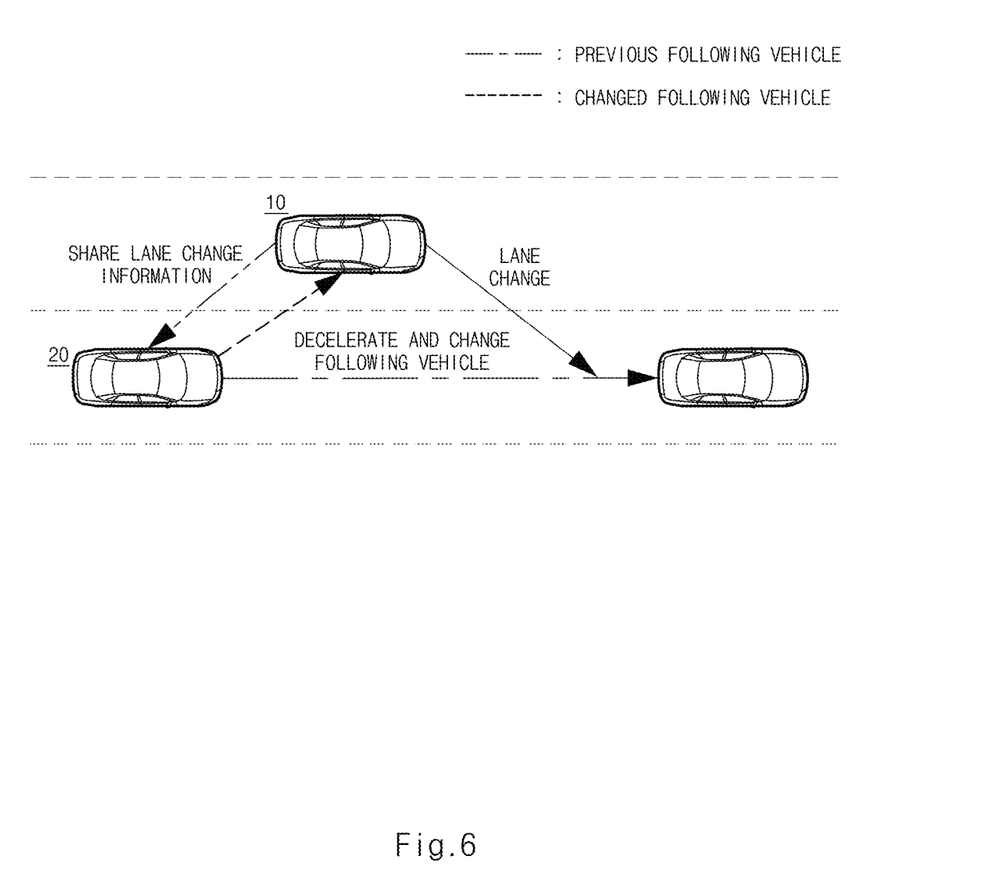
FIG. 6 is a drawing illustrating a process of changing driving control in a vehicle controller according to an embodiment of the present disclosure.

FIG. 6 is a drawing illustrating a process of changing driving control in a vehicle controller according to an embodiment of the present disclosure.

Referring to FIG. 6, a vehicle 10 may determine whether a driver of the vehicle 10 has an intention to make a lane change. When the driver has the intention to make the lane change, the vehicle 10 may share lane change information with a vehicle 20, which is a surrounding vehicle. Thus, receiving the lane change information, the vehicle 20 may determine whether previously received information is identical to currently received information. When the previously received information is not identical to the currently received information, the vehicle 20 may update and display driving guidance information.

When an autonomous vehicle performs forward vehicle following control, a vehicle controller 100 of the vehicle 20 may decelerate and change a following vehicle to the vehicle 10, which enters in front of the vehicle 20, when receiving lane change information from the surrounding vehicle 10.

While a lane keeping assistant system (LKAS) or a forward collision-avoidance assist (FCA) among autonomous driving functions is performed, when lane change information of an adjacent vehicle is received, the vehicle controller 100 may reduce an operation time by a predetermined rate.

A sensor device 200 of FIG. 1 may include one or more sensors which detect an obstacle, for example, a preceding vehicle, located around the vehicle and measure a distance from the obstacle and/or a relative speed of the obstacle.

Furthermore, the sensing device 200 may sense a location of a face or gaze of the driver. To this end, the sensing device 200 may include a camera 210.

Furthermore, the sensing device 200 may sense a steering angle of the vehicle. To this end, the sensing device 200 may include a steering angle sensor 220.

Furthermore, the sensing device 200 may sense a change in acceleration of the vehicle. To this end, the sensing device 200 may include an acceleration sensor 230.

The sensing device 200 may have a plurality of sensors to sense objects outside the vehicle and may obtain information about a location of the object, a speed of the object, a movement direction of the object, and/or a type (e.g., a vehicle, a pedestrian, a bicycle, a motorcycle, or the like) of the object.

To this end, the sensing device 200 may further include an ultrasonic sensor, a radar, a laser scanner and/or a corner radar, a light detection and ranging (LiDAR), a yaw rate sensor, a torque sensor and/or a wheel speed sensor, or the like.

A navigation 300 of FIG. 1 may provide a vehicle route to a target point set by the driver based on map information and may provide the vehicle controller 100 with road curvature information.

A turn signal 400 of FIG. 1 may be selected by the driver to be turned on when the vehicle moves to the right or the left.

A steering controller 500 of FIG. 1 may be configured to control a steering angle of the vehicle and may include a steering wheel, an actuator interlocked with the steering wheel, and a controller for controlling the actuator.

A braking controller 600 of FIG. 1 may be configured to control braking of the vehicle and may include a controller for controlling a brake.

An engine controller 700 of FIG. 1 may be configured to control to drive an engine of the vehicle and may include a controller for controlling a speed of the vehicle.

Figure 7:
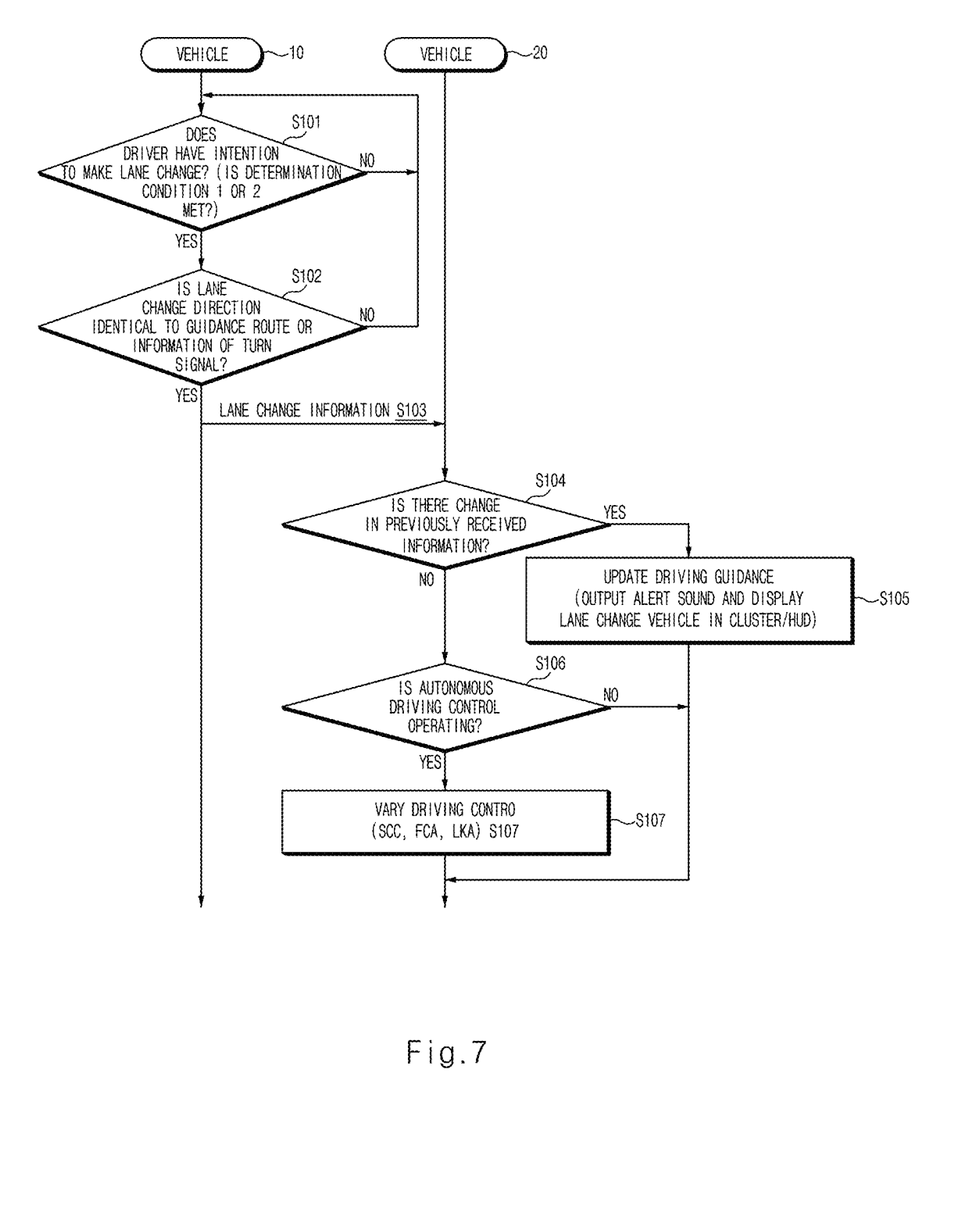
FIG. 7 is a flowchart illustrating a vehicle control method according to an embodiment of the present disclosure.

Hereinafter, a description is given in detail of a vehicle control method according to an embodiment of the present disclosure with reference to FIG. 7. FIG. 7 is a flowchart illustrating a vehicle control method according to an embodiment of the present disclosure.

Hereinafter, it is assumed that a vehicle controller 100 of FIG. 1 performs a process of FIG. 7. Furthermore, in a description of FIG. 7, an operation described as being performed by a vehicle controller 100 may be understood as being controlled by a processor 140 of the vehicle controller 100.

Referring to FIG. 7, in S101, the vehicle controller 100 of a vehicle 10 may determine whether a driver of the vehicle 10 has an intention to make a lane change.

The vehicle controller 100 of the vehicle 10 may determine whether the driver has an intention to make a lane change based on a sensing result of a camera 210 or a steering angle sensor 220 and a braking control signal.

In other words, when the steering angle obtained by subtracting road curvature is greater than or equal to an A value above B seconds, the vehicle controller 100 of the vehicle 10 may determine that the driver has the intention to make the lane change (determination condition).

Furthermore, the vehicle controller 100 of the vehicle 10 may detect a motion and gaze where the driver looks at a side mirror or a window based on image data obtained by capturing a face of the driver. When the motion and the gaze of the driver who looks at the window a predetermined number of times during a predetermined time are detected, the vehicle controller 100 of the vehicle 10 may determine that the driver has the intention to make the lane change (additional condition 1).

Furthermore, when there is a change in acceleration above a predetermined value or when a braking control signal is repeated or is maintained above a certain amount of change, through deceleration and acceleration adjustment before determining an intention to make a lane change, the vehicle controller 100 of the vehicle 10 may determine that the driver has the intention to make the lane change (additional condition 2).

When the determination condition is met and when additional condition 1 or additional condition 2 is additionally met, the vehicle controller 100 of the vehicle 10 may share lane change information with a surrounding vehicle 20.

Furthermore, when one of additional condition 1 or additional condition 2 is met, the vehicle controller 100 of the vehicle 10 may reduce B seconds at a predetermined rate in the determination condition.

When it is determined or when determining that the driver has the intention to make the lane change, in S102, the vehicle controller 100 of the vehicle 10 may determine whether the lane change direction is identical to an existing guidance route or information of the turn signal. For example, when the lane change direction by the intention of the driver of the vehicle 10 is to the right and when the right turn signal is currently turned on or when it is expected to make a right lane change on the route currently being guided, the vehicle controller 100 of the vehicle 10 may determine that the lane change direction is identical to the existing guidance route or the information of the turn signal.

When the lane change direction is the existing guidance route or the information of the turn signal, in S103, the vehicle controller 100 of the vehicle 10 may determine that the driver of the vehicle 10 has the intention to make the lane change and may transmit lane change information to the surrounding vehicle 20.

Thus, receiving the lane change information of the vehicle 10, in S104, the vehicle controller 100 of the vehicle 20 may notify the driver that the lane change information is received by outputting an alert sound and may determine whether lane change information previously received from the vehicle 10 is identical to lane change information currently received from the vehicle 10.

When the previously received lane change information is not identical to the currently received lane change information, in S105, the vehicle controller 100 of the vehicle 20 may determine that there are changes and may update driving guidance information based on the currently received lane change information. In this case, in S105, the vehicle controller 100 of the vehicle 20 may output an alert sound to notify the driver that the driving guidance information is updated or may display a lane change vehicle on an output means, such as a cluster or a head up display (HUD), as shown in FIGS. 3A, 3B, and 3C.

Meanwhile, when the previously received lane change information is identical to the currently received lane change information, in S106, the vehicle controller 100 of the vehicle 20 may determine whether an autonomous driving control function is operating. When the autonomous driving control function is operating, in S107, the vehicle controller 100 of the vehicle 20 may vary or change driving control. In other words, the vehicle controller 100 of the vehicle 20 may change a forward vehicle to the vehicle 10 or may perform deceleration control or the like.

As such, in an embodiment of the present disclosure, the host vehicle may determine whether the driver of the host vehicle has an intention to make a lane change and may share lane change information with a surrounding vehicle, when the driver has the intention to make the lane change. Receiving the information, the surrounding vehicle may change driving guidance information and may change driving control. Thus, an existing limit situation may be improved.

Figure 8:
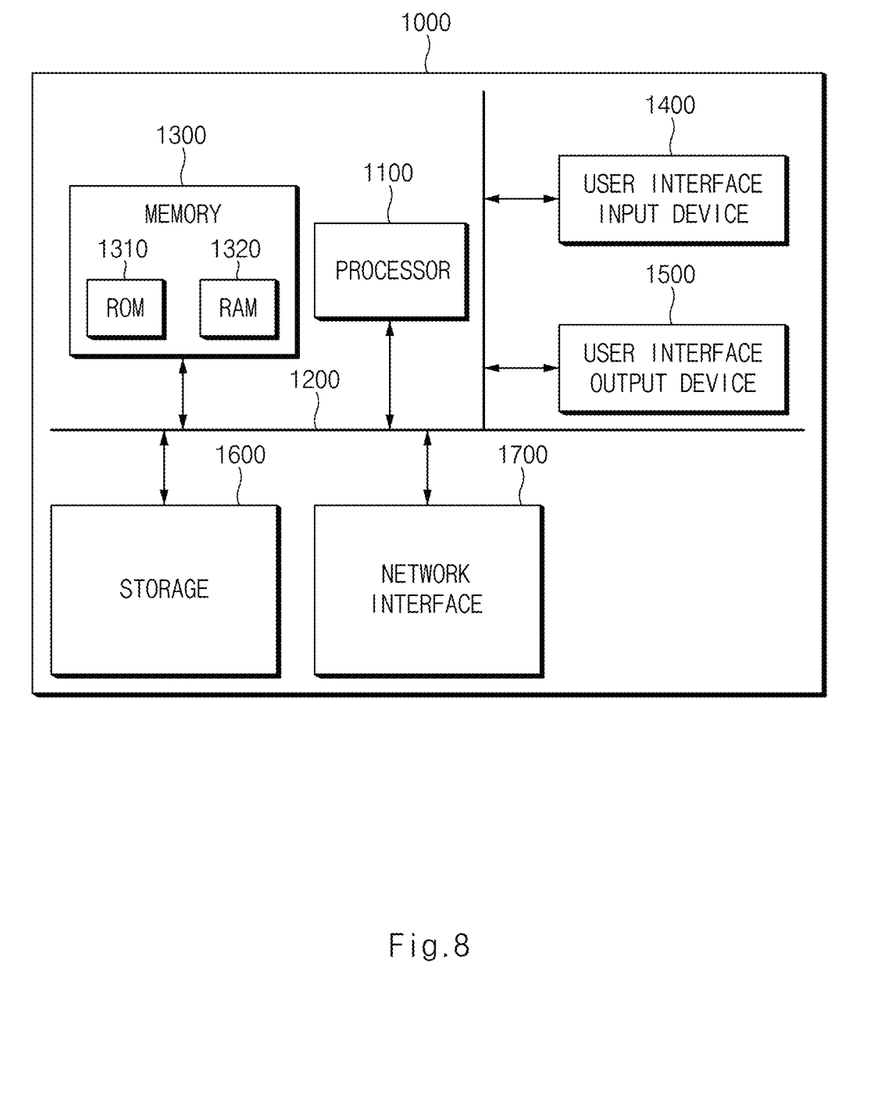
FIG. 8 is a block diagram illustrating a computing system according to an embodiment of the present disclosure.

FIG. 8 is a block diagram illustrating a computing system according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM.

The storage medium may be coupled to the processor and the processor may read information out of the storage medium and may record information in the storage medium. In another embodiment, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

In the present technology, the host vehicle may identify an intention of the driver to make a lane change and may share lane change information of the host vehicle with a surrounding vehicle. The surrounding vehicle may vary or change driving guidance information and may notify the driver of the varied driving guidance information based on the received lane change information and may change driving control. Thus, a collision with the lane change vehicle may be prevented.

In addition, various effects ascertained directly or indirectly through the present disclosure may be provided.

Hereinabove, although the present disclosure has been described with reference to embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims and all the technical ideas within the scope equivalent to the claims should be included in the scope of the present disclosure.

What is claimed is:

1. A vehicle controller of a host vehicle, comprising:
a processor configured to
determine whether a driver has an intention to make a lane change using at least one of a steering angle condition, a gaze condition of the driver, or a driving pattern condition of the driver and share lane change information with a surrounding vehicle, when it is determined that the driver has the intention to make the lane change, and
change driving control of the host vehicle in response to lane change information of the surrounding vehicle; and
a storage storing data and an algorithm run by the processor,
wherein the processor is configured to reduce and apply a predetermined time of the steering angle condition in which a road curvature is corrected, when one of the gaze condition of the driver or the driving pattern condition of the driver is met.

2. The vehicle controller of claim 1, further comprising:
a communication device configured to transmit the lane change information to the surrounding vehicle and receive the lane change information of the surrounding vehicle.

3. The vehicle controller of claim 1, wherein the processor determines whether a gaze of the driver moves to a side mirror or a window above a predetermined number of times during a predetermined time to determine whether the driver has the intention to make the lane change.

4. The vehicle controller of claim 1, wherein the processor is configured to determine whether a change in acceleration is greater than or equal to a predetermined value or whether a braking control signal is generated above a predetermined number of times or is detected above a certain amount of change to determine whether the driver has the intention to make the lane change.

5. The vehicle controller of claim 1, wherein the processor is configured to determine whether a lane change direction is identical to an existing guidance route or ON information of a turn signal, when the driver has the intention to make the lane change and shares the lane change information with the surrounding vehicle, when the lane change direction is identical to the existing guidance route or the ON information of the turn signal.

6. The vehicle controller of claim 1, further comprising:
a camera configured to detect a gaze of the driver;
a steering angle sensor configured to sense a steering angle of the host vehicle; and
an acceleration sensor configured to sense a change in acceleration of the host vehicle.

7. A vehicle control method, comprising:
   determining, by a host vehicle, whether a driver has an intention to make a lane change using at least one of a steering angle condition, a gaze condition of the driver, or a driving pattern condition of the driver;
   sharing, by the host vehicle, lane change information with a surrounding vehicle, when it is determined that the driver has the intention to make the lane change;
   changing, by the surrounding vehicle, driving guidance information based on lane change information and changing driving control of the host vehicle, when receiving lane change information from the surrounding vehicle; and
   reducing and applying, by the host vehicle, a predetermined time of the steering angle condition in which a road curvature is corrected, when one of the gaze condition of the driver or the driving pattern condition of the driver is met.

8. The vehicle control method of claim 7, wherein determining, by the host vehicle, whether the driver has the intention to make the lane change further includes:
   determining whether a gaze of the driver moves to a side mirror or a window above a predetermined number of times during a predetermined time to determine whether the driver has the intention to make the lane change; and
   determining whether a change in acceleration is greater than or equal to a predetermined value or whether a braking control signal is generated above a predetermined number of times or is detected above a certain amount of change to determine whether the driver has the intention to make the lane change.

9. The vehicle control method of claim 7, sharing the lane change information with the surrounding vehicle includes:
   determining, by the host vehicle, whether a lane change direction is identical to a previous guidance route or ON information of a turn signal, when the driver has the intention to make the lane change; and
   sharing, by the host vehicle, the lane change information with the surrounding vehicle, when the lane change direction is identical to the previous guidance route or the ON information of the turn signal.

10. The vehicle control method of claim 7, wherein sharing the driving guidance information and changing the driving control of the host vehicle include:
   displaying, by the surrounding vehicle, that a vehicle which is a target of the lane change information is a lane change vehicle as a real image;
   displaying, by the surrounding vehicle, a lane change direction of the lane change vehicle; and
   displaying words for providing a notification of the lane change.

* * * * *